US010992769B2

(12) United States Patent
Duan (10) Patent No.: US 10,992,769 B2
(45) Date of Patent: Apr. 27, 2021

(54) DATA TRANSMISSION METHOD, APPARATUS AND SYSTEM (71) Applicant: DATANG MOBILE COMMUNICATIONS EQUIPMENT CO., LTD., Beijing (CN)

(72) Inventor: Jianghai Duan, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 362 days.

(21) Appl. No.: 16/081,952

(22) PCT Filed: Jan. 19, 2017

(86) PCT No.: PCT/CN2017/071762
§ 371 (c)(1),
(2) Date: Sep. 4, 2018

(87) PCT Pub. No.: WO2017/152723
PCT Pub. Date: Sep. 14, 2017

(65) Prior Publication Data
US 2020/0296181 A1  Sep. 17, 2020

(30) Foreign Application Priority Data
Mar. 7, 2016 (CN) .......................... 201610127948.2

(51) Int. Cl.
*G06F 15/16* (2006.01)
*H04L 29/08* (2006.01)
(Continued)

(52) U.S. Cl.
CPC ............ *H04L 67/289* (2013.01); *H04L 67/10* (2013.01); *H04L 67/2814* (2013.01);
(Continued)

(58) Field of Classification Search
CPC . H04L 67/289; H04L 67/2814; H04L 67/327; H04L 67/10; H04W 4/50; H04W 28/00; H04W 28/02
See application file for complete search history.

(56) References Cited

U.S. PATENT DOCUMENTS 8,767,728 B2 * 7/2014 Mihaly ................. H04W 8/082
370/389
2013/0294240 A1  11/2013 Suni
(Continued)

FOREIGN PATENT DOCUMENTS

CN   103906055 A   7/2014
CN   104852826 A   8/2015
(Continued)

OTHER PUBLICATIONS

Beck et al., "Mobile Edge Computing: A Taxonomy"; 2014, pp. 48-54 (Year: 2014).*
(Continued)

Primary Examiner — Richard G Keehn
(74) Attorney, Agent, or Firm — Kilpatrick Townsend & Stockton, LLP (57) ABSTRACT Data transmission method, apparatus and system, for broadening MEC application scenarios, are disclosed, so service data cannot only be terminated at a local service platform, but also can be processed by the local service platform and then delivered to a remote service platform for processing; alternatively the service data is processed by the remote service platform and then delivered to the local service platform for processing. The data transmission method includes an MEC server determining, when receiving a service data packet sent by a local service server, a service data packet forwarding mode corresponding to the local service server according to a pre-set data forwarding information table; and the MEC server processing, according to
(Continued)

the service data packet forwarding mode corresponding to the local service server, the service data packet by adopting a processing manner corresponding to the service data packet forwarding mode, and then sending the service data packet.

16 Claims, 4 Drawing Sheets

(51) Int. Cl.
*H04W 28/02* (2009.01)
*H04W 4/50* (2018.01)
*H04W 28/00* (2009.01)

(52) U.S. Cl.
CPC ............ *H04L 67/327* (2013.01); *H04W 4/50* (2018.02); *H04W 28/00* (2013.01); *H04W 28/02* (2013.01)

(56) References Cited

U.S. PATENT DOCUMENTS

| | | | |
|---|---|---|---|
| 2016/0142554 A1* | 5/2016 | Anand | H04L 12/1403 455/406 |
| 2018/0007571 A1* | 1/2018 | Chandramouli | H04W 24/04 |
| 2018/0041958 A1* | 2/2018 | Narayanan | H04L 65/4084 |
| 2018/0048514 A1* | 2/2018 | Arunachalam | H04L 63/20 |
| 2018/0242385 A1* | 8/2018 | Chandramouli | G08G 1/096775 |
| 2018/0249317 A1* | 8/2018 | Kurasugi | H04W 4/50 |
| 2018/0262887 A1* | 9/2018 | Futaki | H04W 92/18 |
| 2018/0270209 A1* | 9/2018 | Arunachalam | H04L 63/0485 |

FOREIGN PATENT DOCUMENTS

| | | |
|---|---|---|
| EP | 2495937 B1 | 6/2013 |
| EP | 2887614 A1 | 6/2015 |
| KR | 20140059494 A | 5/2014 |
| WO | WO-2017100640 A1 * | 6/2017 ............ H04W 76/10 |

OTHER PUBLICATIONS

Yunchao Hu, et al., "Mobile Edge Computing A key technology towards 5G", European Telecommunications Standards Institute White Paper No. 11, ISBN No. 979-10-92620-08-5, in Sep. 2015, 16 pages.

Jianmin Zhang, et al., "Mobile Edge Computing and Field Trial Results for 5G Low Latency Scenario", China Communications, Supplement No. 2, in 2016, 9 pages.

Mobile-Edge Computing (MEC) ETSI Industry Specification Group, "Mobile-Edge Computing (MEC); Service Scenarios", ETSI GS MEC-IEG 004 V1.1.1, http://www.etsi.org/standards-search, in Nov. 2015, 16 pages.

Milan Patel, et al., "Mobile-Edge Computing", Introductory Technical White Paper, in Sep. 2014, 36 pages.

* cited by examiner

DATA TRANSMISSION METHOD, APPARATUS AND SYSTEM

This application is a US National Stage of International Application No. PCT/CN2017/071762, filed on Jan. 19, 2017, designating the United States, and claiming the benefit of Chinese Patent Application No. 201610127948.2, filed with the Chinese Patent Office on Mar. 7, 2016 and entitled "Method, apparatus, and system for transmitting data", which is hereby incorporated by reference in its entirety.

FIELD

The present invention relates to the field of communications, and particularly to a method, apparatus, and system for transmitting data.

BACKGROUND

In the existing network architecture, a service platform is deployed after a core network. As the concept of a 5G network, and a demand for services thereof are proposed, the Mobile Edge Computing (MEC) technology has emerged. With the MEC technology, the service platform can be deployed proximate to a mobile edge.

Service servers are categorized into a local service server and a remote service server dependent upon the real position where the service platform is deployed, where the local service server is deployed at the access network side (e.g., the base station side), and the remote service server is deployed at the core network side, and refers to a service server which is not deployed locally. Since the service server is deployed locally, an MEC server can offload local traffic, so that a User Equipment (UE) can access a local service locally without involving the transmission network and the core network, thus reducing a consumed bandwidth of the transmission network, shortening a service delay, and improving the experience of a user.

The existing data transmission modes can be categorized into two categories, where one of the categories refers to a direct mode, which corresponds to a remote service, and in direct mode, user-plane data are transmitted directly between the UE and the remote service server without involving the local service server; and the other category refers to an offloading mode, which corresponds to a local service, and in offloading mode, user-plane data are transmitted only between the UE and the local service server without involving the remote service server. In a real application, however, there are also some other specific scenarios a video backhaul and analysis scenario, etc.) in which service data need to be processed by the local service server, and then passed to the remote service server for processing, and the demand in the specific scenarios may not be satisfied in the existing data transmission modes above.

In summary, the existing method for transmitting data is only applicable to a limited number of MEC application scenarios, but may not satisfy the specific MEC application scenarios, e.g., the video backhaul and analysis scenario, etc.

SUMMARY

Embodiments of the invention provide a method, apparatus, and system for transmitting data so as to extend MEC application scenarios, so that service data not only can be terminated at a local service platform, but also can be processed by the local service platform, and then passed to a remote service platform for processing, or service data can be processed by a remote service platform, and then passed to a local service platform for processing.

A method for transmitting data at the MEC server side according to an embodiment of the invention includes:
  determining, by an MEC server, a service data packet forwarding mode corresponding to a local service server according to a preset data forwarding information table upon reception of a service data packet transmitted by the local service server, wherein the service data packet forwarding mode is a local data termination mode indicating that the service data packet is only transmitted between a User Equipment (UE) and the local service server, or the service data packet forwarding mode is a local data passing mode indicating that the service data packet being transmitted between the UE and a remote service server needs to be processed by the local service server; and
  processing, by the MEC server, the service data packet in a processing scheme corresponding to the service data packet forwarding mode according to the service data packet forwarding mode corresponding to the local service server, and then transmitting, by the MEC server, the service data packet.

With this method according to the embodiment of the invention, an MEC server determines a service data packet forwarding mode corresponding to a local service server according to a preset data forwarding information table upon reception of a service data packet transmitted by the local service server, and further processes the service data packet in a processing scheme corresponding to the service data packet forwarding mode according to the service data packet forwarding mode corresponding to the local service server, and then transmitting, by the MEC server, the service data packet, thus extending MEC application scenarios, so that service data not only can be terminated at a local service platform, that is, the service data only needs to be processed by the local service server, without involving the remote service server, to thereby handle the entire service; but also can be processed by the local service platform, and then passed to a remote service platform for processing, or service data can be processed by a remote service platform, then passed to a local service platform for processing, and thereafter transmitted to the UE.

In one embodiment, determining, by the MEC server, the service data packet forwarding mode corresponding to the local service server according to the preset data forwarding information table upon reception of the service data packet transmitted by the local service server includes:
  searching, by the MEC server, upon reception of the service data packet transmitted by the local service server, the preset data forwarding information table for a service data packet forwarding mode corresponding to an IP address of the local service server according to the IP address of the local service server carried in the service data packet, and determining, by the MEC server, the service data packet forwarding mode corresponding to the local service server.

In one embodiment, processing, by the MEC server, the service data packet in the processing scheme corresponding to the service data packet forwarding mode according to the service data packet forwarding mode corresponding to the local service server, and then transmitting, by the MEC server, the service data packet includes:
  when the service data packet forwarding mode corresponding to the local service server is the local data passing mode, and a destination IP address obtained by the MEC server from the service data packet is an IP address of the remote service server, modifying, by the MEC server, a format of the service data packet, determining, by the MEC server, an uplink bearer for transmitting the modified service data packet to the remote service server, and transmitting, by the MEC server, the modified service data packet over the uplink bearer; or when the service data packet forwarding mode corresponding to the local service server is the local data passing mode, and a destination IP address obtained by the MEC server from the service data packet is an IP address of the UE, determining, by the MEC server, a downlink bearer for transmitting the service data packet to the UE, and transmitting, by the MEC server, the service data packet over the downlink bearer.

So that the service date transmitted from the UE can be processed by the local service platform, and then transmitted to a remote service server for processing, or, the service date transmitted from the remote service server can be processed by the local service platform, and then transmitted to a UE for processing.

In one embodiment, when the service data packet forwarding mode corresponding to the local service server is the local data passing mode, and the destination IP address obtained by the MEC server from the service data packet is the IP address of the remote service server, modifying, by the MEC server, the format of the service data packet, determining, h the MEC server, the uplink bearer for transmitting the modified service data packet to the remote service server, and transmitting, by the MEC server, the modified service data packet over the uplink bearer includes:

obtaining, by the MEC server, the IP address of the UE from a payload of the service data packet transmitted by the local service server according to a prescribed format, and then removing the IP address of the UE, and composing a new service data packet; and obtaining, by the MEC server, an IP address of the local service server and information about an Access Point Name (APN) corresponding to an IP address of the remote service server according to the preset data forwarding information table, determining, by the MEC server, the uplink bearer, corresponding to the UE, wider the APN, and transmitting, by the MEC server, the new service data packet to a System Architecture Evolved Gateway (SAE-GW) over the uplink bearer, so that the SAE-GW transmits the new service data packet to the remote service server.

In one embodiment, when the service data packet forwarding mode corresponding to the local service server is the local data passing mode, and the destination IP address obtained by the MEC server from the service data packet is the IP address of the UE, determining, by the MEC server, the downlink bearer for transmitting the service data packet to the UE, and transmitting, by the MEC server, the service data packet over the downlink bearer includes:

searching, by the MEC server, a pre-stored corresponding relationship table between the IP address of the UE and the bearer for bearer information corresponding to the UE according to the IP address of the UE obtained from the service data packet; and determining, by the MEC server, the downlink bearer for transmitting the service data packet to the UE according to the bearer information, and transmitting by the MEC server, the service data packet to an e-NB over the downlink bearer, wherein the c-NB transmits the service data packet to the UE.

In one embodiment, processing, by the MEC server, the service data packet in the processing scheme corresponding to the service data packet forwarding mode according to the service data packet forwarding mode corresponding to the local service server, and then transmitting, by the MEC server, the service data packet includes:

when the service data packet forwarding mode corresponding to the local service server is the local data termination mode, determining, by the MEC server, that the service data packet needs to be transmitted to the UE; and obtaining, by the MEC server, an IP address of the UE from the service data packet, determining, a downlink bearer for transmitting the service data packet to the UE, according to the IP address of the UE, and transmitting the service data packet to an e-NB over the downlink bearer, wherein the e-NB transmits the service data packet to the UE.

In one embodiment, the method further includes:
obtaining, by the MEC server, upon reception of a service data packet forwarded by a System Architecture Evolved Gateway (SAE-GW), a destination IP address from the service data packet; and upon determining that the destination IP address is an IP address of the local service server, transmitting, by the MEC server, the received service data packet to the local service server; or upon determining that the destination IP address is an IP address of the UE, determining, by the MEC server, a downlink carrier for transmitting the service data packet to the UE, according to an IP address of the UE, and transmitting, by the MEC server, the received service data packet to an e-NB over the downlink bearer, wherein the e-NB transmits the service data packet to the UE.

A method for transmitting data at the local service server side according to an embodiment of the invention includes:

carrying, by a local service server, an IP address of the local service server as a source IP address, and an IP address of a remote service server as a destination IP address in the service data packet when the local service server needs to transmit a service data packet to the remote service server, adding, by the local service server, an IP address of a User Equipment (UE) to a payload of the service data packet according to a prescribed format, and composing, by the local service server, a new service data packet; and transmitting, by the local service server, the new service data packet to a Mobile Edge Computing (MEC) server, wherein the MEC server determines a service data packet forwarding mode corresponding to the local service server according to the IP address of the local service server, processes the service data packet in a processing scheme corresponding to the service data packet forwarding mode according to the service data packet forwarding mode corresponding to the local service server, and then transmitting the service data packet.

In one embodiment, the method further includes:
receiving, by the local service server, a service data packet, transmitted by the remote service server, forwarded by the MEC server; and processing, by the local service server, the received service data packet, and then generating, by the local service server, a service data packet to be transmitted, carrying, by the local service server, the IP address of the local service server as a source IP address, and the IP address of the UE as a destination IP address in the generated service data packet; and transmitting, by the local service server, the service data packet to the MEC server, so that the MEC server transmits the received service data packet to the UE.

An apparatus for transmitting data at the MEC server side according to an embodiment of the invention includes:
- a determining device configured to determine a service data packet forwarding mode corresponding to a local service server according to a preset data forwarding information table upon reception of a service data packet transmitted by the local service server, wherein the service data packet forwarding mode is a local data termination mode indicating that the service data packet is only transmitted between a User Equipment (UE) and the local service server, or the service data packet forwarding mode is a local data passing mode indicating that the service data packet being transmitted between the UE and a remote service server needs to be processed by the local service server; and
- a processing device configured to process the service data packet in a processing scheme corresponding to the service data packet forwarding mode according to the service data packet forwarding mode corresponding to the local service server, and then transmit the service data packet.

In one embodiment, the determining device is configured:
upon reception of the service data packet transmitted by the local service server, to search the preset data forwarding information table for a service data packet forwarding mode corresponding to an IP address of the local service server according to the IP address of the local service server carried in the service data packet, and to determine the service data packet forwarding mode corresponding to the local service server.

In one embodiment, the processing device is configured:
when the service data packet forwarding mode corresponding to the local service server is the local data passing mode, and a destination IP address obtained from the service data packet is an IP address of the remote service server, to modify a format of the service data packet, to determine an uplink bearer for transmitting the modified service data packet to the remote service server, and to transmit the modified service data packet over the uplink bearer; or
when the service data packet forwarding mode corresponding to the local service server is the local data passing mode, and a destination IP address obtained from the service data packet is an IP address of the UE, to determine a downlink bearer for transmitting the service data packet to the UE, and to transmit the service data packet over the downlink bearer.

In one embodiment, the processing device configured to modify the format of the service data packet, to determine the uplink bearer for transmitting the modified service data packet to the remote service server, and to transmit the modified service data packet over the uplink bearer is configured:
to obtain the IP address of the UE from a payload of the service data packet transmitted by the local service server according to a prescribed format, and then remove the IP address of the UE, and to compose a new service data packet; and
to obtain an IP address of the local service server and information about an Access Point Name (APN) corresponding to an IP address of the remote service server according to the preset data forwarding information table, to determine the uplink bearer; corresponding to the UE, under the APN, and to transmit the new service data packet to a System Architecture Evolved Gateway (SAE-GW) over the uplink bearer, so that the SAE-GW transmits the new service data packet to the remote service server.

In one embodiment, the processing device configured to determine the downlink bearer for transmitting the service data packet to the UE, and to transmit the service data packet over the downlink bearer is configured:
- to search a pre-stored corresponding relationship table between the IP address of the UE and the bearer for bearer information corresponding to the UE according to the IP address of the UE obtained from the service data packet; and
- to determine the downlink bearer for transmitting the service data packet to the UE according to the bearer information, and to transmit the service data packet to an e-NB over the downlink bearer, wherein the e-NB transmits the service data packet to the UE.

In one embodiment, the processing device is further configured:
when the service data packet forwarding mode is the local data termination mode, to determine that the service data packet needs to be transmitted to the UE; and
to obtain an IP address of the UE from the service data packet, to determine a downlink bearer for transmitting the service data packet to the UE, according to the IP address of the UE, and to transmit the service data packet to an e-NB over the downlink bearer, wherein the e-NB transmits the service data packet to the UE.

In one embodiment, the determining device is further configured, upon reception of a service data packet forwarded by a System Architecture Evolved Gateway (SAE-GW), to obtain a destination IP address from the service data packet, and to determine a network entity corresponding to the destination IP address; and
the processing device is further configured: when the determining device receives the service data packet forwarded by the SAE-GW, and determines that the network entity corresponding to the destination IP address in the service data packet is the local service server, to transmit the service data packet received by the determining device to the local service server; or
when the determining device receives the service data packet forwarded by the SAE-GW, and determines that the network entity corresponding to the destination IP address in the service data packet is the UE, to determine a downlink carrier for transmitting the service data packet to the UE, according to an IP address of the UE, and to transmit the service data packet received by the determining device to an e-NB over the downlink bearer, wherein the e-NB transmits the service data packet to the UE.

An apparatus for transmitting data at the local service server side according to an embodiment of the invention includes:
- a processing device configured, when a service data packet needs to be transmitted to a remote service server, to carry an IP address of the apparatus as a source IP address, and an IP address of the remote service server as a destination IP address in the service data packet, to add an IP address of a User Equipment (UE) to a payload of the service data packet according to a prescribed format, and to compose a new service data packet; and
- a transmitting device configured to transmit the new service data packet to a Mobile Edge Computing (MEC) server, wherein the MEC server determines a service data packet forwarding mode corresponding to the apparatus according to the IP address of the apparatus, and processes the service data packet in a processing scheme corresponding to the service data packet forwarding mode according to the service data packet forwarding mode corresponding to the apparatus, and then transmits the service data packet.

In one embodiment, the processing device is farther configured:

to receive a service data packet, transmitted by the remote service server, forwarded by the MEC server, to process the received service data packet, and then generate a service data packet to be transmitted, to carry the IP address of the apparatus as a source IP address, and the IP address of the UE as a destination IP address in the generated service data packet; and the transmitting device further configured to transmit the generated service data packet carrying the IP address of the apparatus, and the IP address of the UE to the MEC server, wherein the MEC server transmits the received service data packet to the UE.

A system for transmitting data according to an embodiment of the invention includes the apparatus above at the MEC server side for transmitting data, and the apparatus at the local service server side for transmitting data.

DETAILED DESCRIPTION OF THE EMBODIMENTS

The embodiments of the invention provide a method, apparatus, and system for transmitting data so as to extend MEC application scenarios, so that service data not only can be terminated at a local service platform, but also can be processed by the local service platform, and then passed to a remote service platform for processing, or service data can be processed by a remote service platform, and then passed to a local service platform for processing.

In the embodiments of the invention, an MEC server is preconfigured with local service template information, e.g., IP addresses of local service servers, prefixes of the IP addresses, etc., where the information can be configured by an Operation Management (OM) entity, although the embodiments of the invention will not be limited thereto. Furthermore in the embodiments of the invention, also in view of the problem in the prior art of failing to satisfy a specific MEC application scenario (e.g., a video backhaul and analysis scenario, etc.), for the respective local service servers, data packet forwarding modes corresponding to the local service servers are configured respectively, where the data packet forwarding modes are local data termination modes or local data passing modes, particularly as represented in a data forwarding information table depicted in Table 1. For example, the data forwarding information table can be preconfigured by the OM entity for the respective local service servers, and stored in the MEC server, where information in the data forwarding information table includes but will not be limited to a data packet forwarding mode, an IP address of a remote service server, an APN hosting a remote service, etc., and the local service servers may or may not correspond to the remote service servers in a one-to-one manner. The local service servers at the different IP addresses can handle different local services accordingly, for example.

TABLE 1

Data forwarding information table

| Address of a local service server | Data packet forwarding mode | Address of a remote service server | APN hosting a remote service |
|---|---|---|---|
| Local service server $IP_1$ | Local data termination mode | Null and void | Null and void |
| Local service server $IP_2$ | Local data passing mode | Remote service server $IP_5$ | $APN_1$ |
| Local service server $IP_3$ | Local data passing mode | Remote service server $IP_6$ | $APN_1$ |
| Local service server $IP_4$ | Local data passing mode | Remote service server $IP_7$ | $APN_2$ |
| ... | ... | ... | ... |

In this way, upon reception of a user-plane service data packet transmitted by a local service server, the MEC server determines a service data packet forwarding mode corresponding to the local service server according to the preset data forwarding information table, and processes and then transmits the service data packet in a processing scheme corresponding to the service data packet forwarding mode according to service data packet forwarding mode corresponding to the local service server, so that the service data not only can be terminated at a local service platform, but also can be processed by the local service platform, and then passed to a remote service platform for processing.

Figure 1:
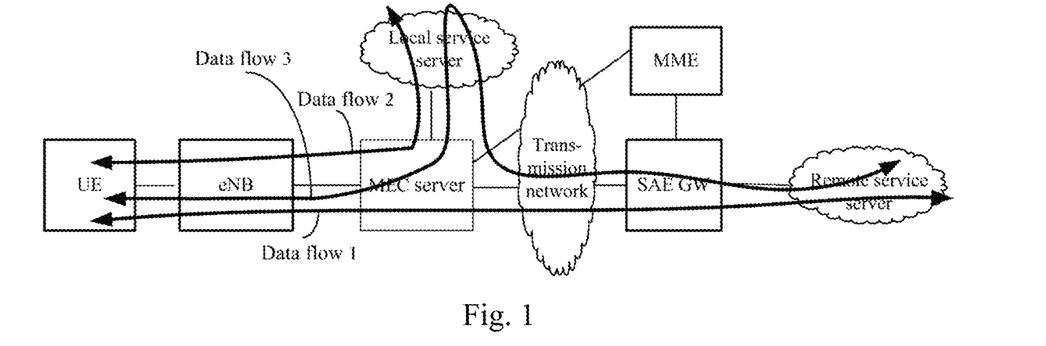
FIG. 1 is a schematic diagram of a system network architecture and service data flows thereof according to an embodiment of the invention.

Specifically FIG. 1 illustrates a schematic diagram of a system network architecture and service data flows thereof according to an embodiment of the invention, where all of an MEC server, an evolved Node B (e-NB), and a local service server are deployed at the same network layer, i.e., proximate to a mobile edge, and the MEC server is connected with the e-NB and the local service server; and the Evolved Packet Core (EPC) network side includes a Mobility Management Entity (MME) and an SAE-GW, a remote service server following the EPC is deployed at a higher network layer (e.g., in a core equipment room), the MEC server is connected on an S1 interface between the e-NB and the EPC, and the MEC server is connected with the EPC over a transmission network (e.g., a PTN network).

There may be three bidirectional data transmission paths in the network architecture illustrated in FIG. 1.

The first bidirectional data transmission path corresponds to a data flow 1 in FIG. 1, where a data transmission direction thereof can be represented as UE←→e-NB←→MEC Server←→SAE-GW←→Remote Service Server, that is, a user-plane service data packet can originate from the UE, and be transmitted through the e-NB, the MEC server, and the SAE-GW respectively, and finally to the remote service server; or a user-plane service data packet can originate from the remote service server, and be transmitted through the SAE-GW, the MEC server, and the e-NB respectively, and finally to the UE.

This data transmission process only involves handling of a remote service, and this transmission mode will be referred to as a direct mode. A specific implementation thereof is as follows.

For an uplink service data packet transmitted by the UE, a destination IP address accessed by the UE is the IP address of the remote service server in a PDN network, so upon reception of the service data packet, transmitted by the UE, forwarded by the e-NB, the MEC server obtains a source IP address (here the source IP address is the IP address of the UE) and the destination IP address in the service data packet, and determines that the service data packet is to be transmitted to the remote service server; so that the MEC server transmits the service data packet transparently to the SAE-GW in a public network, and the SAE-GW transmits the service data packet to the remote service server. Of course, before the service data packet is transmitted to the SAE-GW, the MEC server needs to determine an uplink bearer; and further transmits the service data packet to the SAE-GW over the uplink bearer. The uplink bearer can be determined, for example, in such a way that the MEC server listens to signaling and service data of the S1 interface, obtains a corresponding relationship between the IP address and the bearer of the UE, and then determines the uplink bearer for transmitting the service data packet to the SAE-GW.

For a downlink service data packet transmitted by the remote service server, a destination IP address accessed by the remote service server is the IP address of the UE, so upon reception of the service data packet, transmitted by the remote service server, forwarded by the SAE-GW in the public network, the MEC server obtains a source IP address (here the source IP address is the IP address of the remote service server) and the destination IP address in the service data packet, and determines that the service data packet is to be transmitted to the UE, so that the MEC server transmits the service data packet transparently to the e-NB, and the e-NB transmits the service data packet to the UE. Of course, before the service data packet is transmitted to the e-NB, the MEC server also needs to determine a downlink bearer, and further transmits the service data packet to the e-NB over the downlink bearer. The downlink bearer can be determined, for example, in such a way that the MEC server listens to signaling and service data of the S1 interface, obtains a corresponding relationship between the IP address and the bearer of the UE, and then determines the downlink bearer for transmitting the service data packet to the e-NB.

The second bidirectional data transmission path corresponds to a data flow 2 in FIG. 1, where a data transmission direction thereof can be represented as UE←→e-NB←→MEC Server←→Local Service Server, that is, a user-plane service data packet can originate from the UE, and be transmitted through the e-NB and the MEC server respectively, and finally to the local service server, or a user-plane service data packet can originate from the local service server, and be transmitted through the MEC server and the e-NB respectively; and finally to the UE.

The third bidirectional data transmission path corresponds to a data flow 3 in FIG. 1, where a data transmission direction thereof can be represented as UE←→e-NB←→MEC Server←→Local Service Server←→MEC Server←→SAE-GW←→Remote Service Server, that is, a user-plane service data packet can originate from the UE, and be transmitted to the local service server through the e-NB and the MEC server respectively, processed and then transmitted by the local service server to the MEC server, further transmitted by the MEC server to the SAE-GW, and finally transmitted by the SAE-GW to the remote service server for processing; or a user-plane user data packet can originate from the remote service server, and be transmitted to the local service server for processing through the SAE-GW and the MEC server respectively, processed and then transmitted by the local service server to the MEC server, transmitted by the MEC server to the e-NB, and finally transmitted by the e-NB to the UE.

Figure 2:
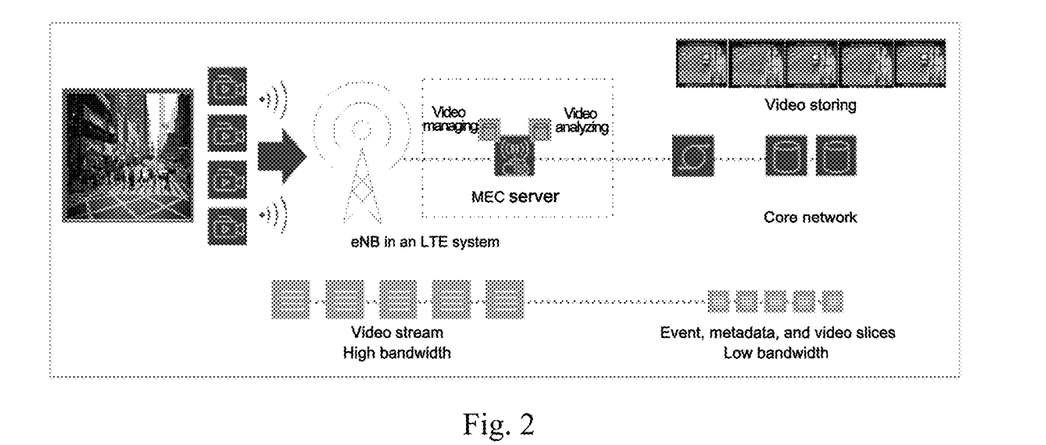
FIG. 2 is an application scenario diagram of a video backhaul and analysis scenario according to an embodiment of the invention.

This third transmission mode can be applicable to specific MEC application scenarios, e.g.; a video backhaul and analysis scenario; etc. FIG. 2 illustrates a video backhaul and analysis application scenario. In this scenario, an LTE terminal (a camera) acquires a video stream; the video stream is transmitted back to a local service platform over an LTE network (in the uplink); and the local service platform processes the video stream which is transmitted back, through code-converting, storing, managing, compressing, video analyzing, etc., where the local service platform can configure an event (e.g., a moving object, a lost child, a luggage, etc.), detect and signal it, and thereafter transmit the processed data including the event, metadata, video slices, etc., to a remote service platform in a core equipment room. Since the local service platform converts the high-bandwidth video stream into the low-bandwidth event, metadata, video slices, etc., a transmission bandwidth can be significantly saved. This application scenario can be widely applicable to the fields of public security, intelligent cities, etc.

Since both the transmission modes of the second and third data transmission processes above can be referred to as an offloading mode, a method for transmitting data in the second and third offloading modes above will be described below in details.

Figure 3:
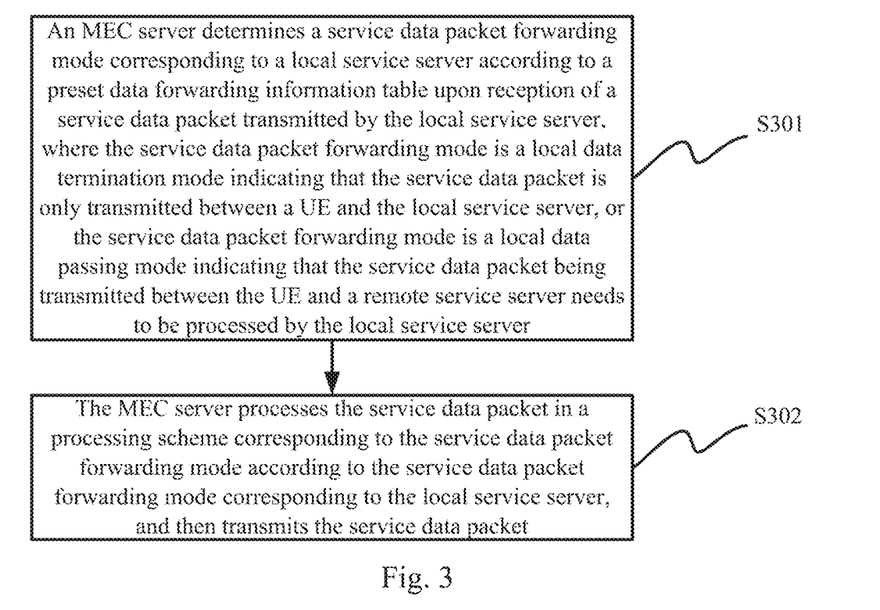
FIG. 3 is a schematic flow chart of a method for transmitting data according to an embodiment of the invention.

Referring to FIG. 3, a method for transmitting data at the MEC server side according to an embodiment of the invention includes the following operations.

S301. An MEC server determines a service data packet forwarding mode corresponding to a local service server according to a preset data forwarding information table upon reception of a service data packet transmitted by the local service server, where the service data packet forwarding mode is a local data termination mode indicating that the service data packet is only transmitted between a UE and the local service server, or the service data packet forwarding mode is a local data passing mode indicating that the service data packet being transmitted between the UE and a remote service server needs to be processed by the local service server.

Here the preset data forwarding information table can be preconfigured by an OM entity for respective local service servers, and then stored in the MEC server as described above, so a repeated description thereof will be omitted here.

S302. The MEC server processes the service data packet in a processing scheme corresponding to the service data packet forwarding mode according to the service data packet forwarding mode corresponding to the local service server, and then transmits the service data packet.

In one embodiment, in the operation S301: upon reception of the service data packet transmitted by the local service server, the MEC server searches the preset data forwarding information table for a service data packet forwarding mode corresponding to an IP address of the local service server according to the IP address of the local service server carried in the service data packet, and determines the service data packet forwarding mode corresponding to the local service server.

In one embodiment, there are the following two instances of the operation S302.

In the first instance, the service data packet forwarding mode corresponding to the local service server is the local data passing mode.

In this local data passing mode, when a destination IP address obtained by the MEC server from the service data packet is an IP address of the remote service server, the MEC server modifies a format of the service data packet, determines an uplink bearer for transmitting the modified service data packet to the remote service server, and transmits the modified service data packet over the uplink bearer; or when the service data packet forwarding mode corresponding to the local service server is the local data passing mode, and a destination IP address obtained by the MEC server from the service data packet is an IP address of the UE, the MEC server determines a downlink bearer for transmitting the service data packet to the UE, and transmits the service data packet over the downlink bearer.

In the second instance, the service data packet forwarding mode corresponding to the local service server is the local data termination mode.

When the MEC server determines that the service data packet forwarding mode corresponding to the local service server is the local data termination mode, the MEC server determines that the service data packet needs to be transmitted to the UE; and the MEC server obtains an IP address of the UE from the service data packet, determines a downlink bearer for transmitting the service data packet to the UE, according to the IP address of the UE, and transmits the service data packet to an e-NB over the downlink bearer, and the e-NB transmits the service data packet to the UE.

In one embodiment, in the first instance above, when the service data packet forwarding mode corresponding to the local service server is the local data passing mode, and the destination IP address obtained by the MEC server from the service data packet is the IP address of the remote service server, the MEC server modifies the format of the service data packet, determines the uplink bearer for transmitting the modified service data packet service data packet to the remote service server, and transmits the modified service data packet over the uplink bearer, specifically as follows.

The MEC server obtains the IP address of the UE from a payload of the service data packet transmitted by the local service server according to a prescribed format, and then removes the IP address of the UE, and composes a new service data packet; and the MEC server obtains an IP address of the local service server and information about an Access Point Name (APN) corresponding to an IP address of the remote service server according to the preset data forwarding information table, determines the uplink bearer, corresponding to the UE, under the APN, and transmits the new service data packet to a System Architecture Evolved Gateway (SAE-GW) over the uplink bearer, and the SAE-GW transmits the new service data packet to the remote service server.

Furthermore it shall be further noted that after the MEC server obtains the IP address of the local service server and the information about the APN corresponding to the IP address of the remote service server, if the MEC server determines that there are a plurality of bearers, corresponding to the UE, under the APN, then it may further select one of the bearers according to a Quality of Service (QoS) attribute.

In one embodiment, in the first instance above, when the service data packet forwarding mode corresponding to the local service server is the local data passing mode, and the destination IP address obtained by the MEC server from the service data packet is the IP address of the UE, the MEC server determines the downlink bearer for transmitting the service data packet to the UE, and transmits the service data packet over the downlink bearer as follows.

The MEC server searches a pre-stored corresponding relationship table between the IP address of the UE and the bearer for bearer information corresponding to the UE according to the IP address of the UE obtained from the service data packet.

Here the corresponding relationship table between the IP address of the UE and the bearer can be pre-stored in the MEC server, for example, in such a way that the MEC server obtains the corresponding relationship table between the IP address of the UE and the bearer by listening to signaling and service data of an S1 interface, and store it in a local file.

The MEC determines the downlink bearer for transmitting the service data packet to the UE according to the bearer information, and transmits the service data packet to an e-NB over the downlink bearer, and the e-NB transmits the service data packet to the UE.

In one embodiment, in the second instance above, when the MEC server determines that the service data packet corresponding to the local service server is the local data termination mode, the MEC server obtains the IP address of the UE from the service data packet; and determines the downlink bearer for transmitting the service data packet to the UE; according to the IP address of the UE, for example, the MEC server can obtain a corresponding relationship between the IP address of the UE and the bearer by listening to signaling and service data of an S1 interface, and then determine the downlink bearer for transmitting the service data packet to the UE.

Furthermore there is such a premise for an application of the method for transmitting service data as illustrated in FIG. 3 that after a service data flow is processed by the local service server, the local service server transmits the service data packet to the MEC server, and furthermore the MEC server determines the service data packet forwarding mode corresponding to the local service server, processes the service data packet in the processing scheme corresponding to the service data packet forwarding anode, and then transmits the service data packet. Of course, the method for transmitting data further includes the following processes.

Upon reception of a service data packet forwarded by the SAE-GW, the MEC server obtains a destination IP address from the service data packet; and upon determining that the destination IP address is the IP address of the local service server, the MEC server transmits the received service data packet to the local service server.

In this way, the service data transmitted by the remote service server can be transmitted to the UE after being processed by the local service server.

Alternatively upon determining that the destination IP address is the IP address of the UE, the MEC server determines a downlink bearer for transmitting the service data packet to the UE, according to the IP address of the UE, and transmits the received service data packet to the e-NB over the downlink bearer, and the e-NB transmits the service data packet to the UE. This instance corresponds to the direct mode as described above.

Figure 4:
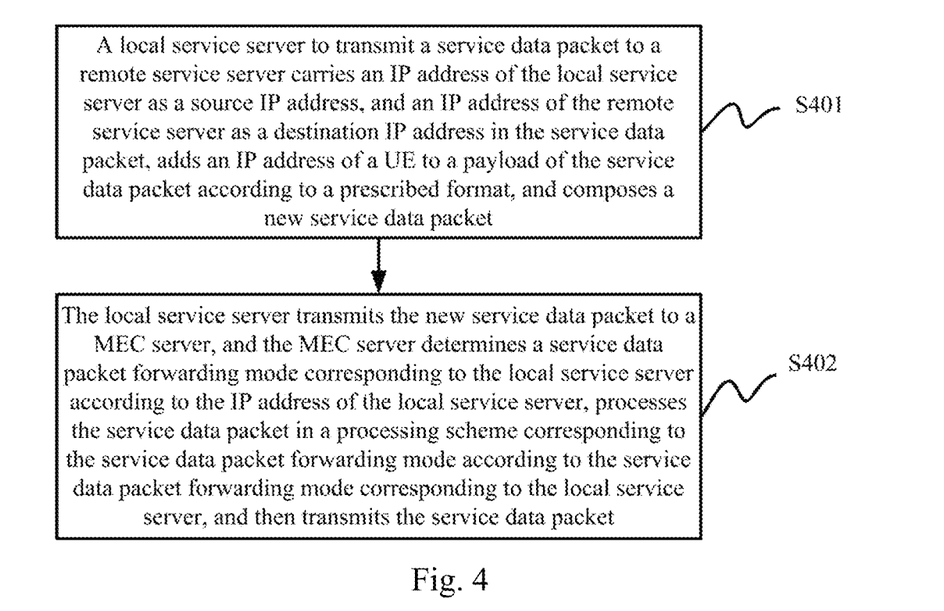
FIG. 4 is a schematic flow chart of another method for transmitting data according to an embodiment of the invention.

Referring to FIG. 4, an embodiment of the invention further provides a method for transmitting data at the MEC server side, where the method includes the following operations.

S401. A local service server to transmit a service data packet to a remote service server carries an IP address of the local service server as a source IP address, and an IP address of the remote service server as a destination IP address in the service data packet, adds an IP address of a UE to a payload of the service data packet according to a prescribed format, and composes a new service data packet.

S402. The local service server transmits the new service data packet to a Mobile Edge Computing (MEC) server, and the MEC server determines a service data packet forwarding mode corresponding to the local service server according to the IP address of the local service server, processes the service data packet in a processing scheme corresponding to the service data packet forwarding mode according to the service data packet forwarding mode corresponding to the local service server, and then transmits the service data packet.

As can be apparent, the local service server in the method illustrated in FIG. 4 corresponds to a local data passing mode.

Further to the method for transmitting data as illustrated in FIG. 4, the method further includes: the local service server receives a service data packet, transmitted by the remote service server, forwarded by the MEC server; and the local service server processes the received service data packet, and then generates a service data packet to be transmitted, carries the IP address of the local service server as a source IP address, and the IP address of the UE as a destination IP address in the generated service data packet, and then transmits the service data packet to the MEC server, and the MEC server transmits the received service data packet to the UE.

Processes for processing a format of a user-plane service data packet being transmitted ilk by network entities during the transmission process of the user-plane service data packet will be described below by way of an example.

Figure 5A:
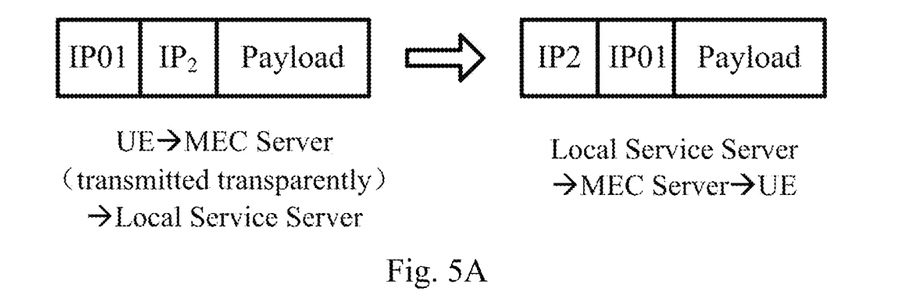
FIG. 5A is a schematic diagram of a process for processing a service data packet format while data are being transmitted according to an embodiment of the invention.

FIG. 5A illustrates processes for processing a format of a service data packet, transmitted between the UE and the local service server, by the UE and the local service server respectively.

For example, the UE is connected with both an APN1 and an APN2; the SAE-GW allocates an IP address, i.e., $IP_{01}$, for the UE, for the connection between the UE and the APN1, and an IP address, i.e., $IP_{02}$, for the UE, for the connection between the UE and the APN2; and at this time, the UE accesses the local service server at an IP address, which is $IP_2$. When the UE is to transmit a service data packet to the local service server, the UE processes a format of the service data packet, thus resulting in a service data packet format represented as a format on the left of an arrow in FIG. 5A, where $IP_{01}$ corresponds to the current IP address of the UE (i.e., a source IP address), and $IP_2$ corresponds to the IP address of the local service server currently accessed by the UE (i.e., a destination IP address).

Correspondingly a format on the right of the arrow in FIG. 5A represents a service data packet format resulting from the local service server processing a format of a service data packet to be transmitted by the local service server to the UE, where $IP_2$ corresponds to the IP address of the local service server (i.e., a source IP address), and $IP_{01}$ represents the IP address of the UE currently accessed by the local service server (i.e., a destination IP address).

Figure 5B:
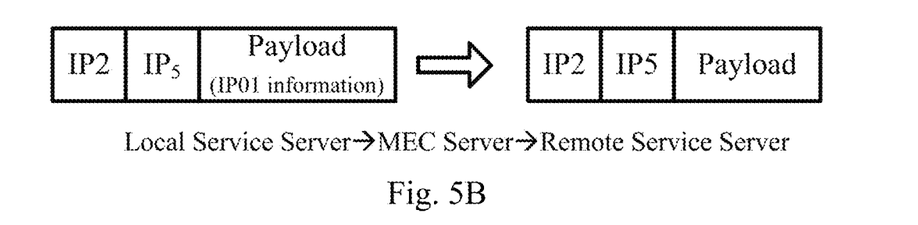
FIG. 5B is a schematic diagram of another process for processing a service data packet format while data are being transmitted according to an embodiment of the invention.

In connection with FIG. 5A, upon reception of the service data packet transmitted by the UE, the local service server processes the service data packet accordingly, and then transmits the service data packet to the remote service server, and FIG. 5B illustrates processes for processing the format of the service data packet by the local service server and the MEC server respectively.

For example, an IP address of the remote service server to be accessed by the local service server is $IP_5$, so when the local service server is to transmit a service data packet to the MEC server, the local service server processes a format of the service data packet as follows: the local service server carries the IP address of the local service server (i.e., $IP_2$) as a source IP address, and the IP address of the remote service server (i.e., $IP_5$) as a destination IP address in the service data packet, adds the IP address of the UE (i.e., $IP_{01}$) to a payload of the service data packet according to a prescribed format, and composes a new service data packet, thus resulting in a service data packet format represented as a format on the left of an arrow in FIG. 5B, where $IP_{02}$ corresponds to the IP address of the local service server (i.e., a source IP address), $IP_5$ corresponds to the IP address of the remote service server (i.e., a destination IP address), and $IP_{01}$ carried in the payload corresponds to the IP address of the UE.

Correspondingly, upon reception of the service data packet transmitted by the local service server, the MEC server processes the service data packet as follows: the MEC server obtains the IP address of the UE (i.e., $IP_{01}$) from the payload of the service data packet transmitted by the local service server according to the prescribed format, and then removes the IP address of the UE, composes a new service data packet, and further transmits the new service data packet to the SAE-GW, and the SAE-GW transmits the new service data packet to the remote service server, where a format of the new service data packet is represented as a format on the right of the arrow in FIG. 5B.

Figure 6:
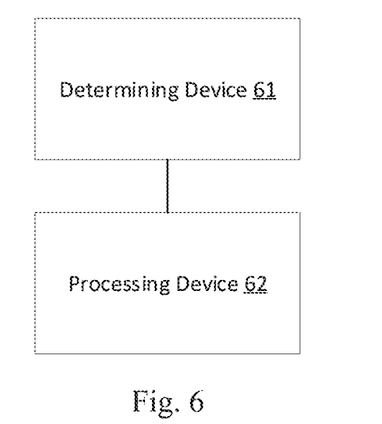
FIG. 6 is a schematic structural diagram of an apparatus for transmitting data according to an embodiment of the invention.

Referring to FIG. 6, an apparatus for transmitting data at the MEC server side according to an embodiment of the invention includes: a determining device 61 configured to determine a service data packet forwarding mode corresponding to a local service server according to a preset data forwarding information table upon reception of a service data packet transmitted by the local service server, where the service data packet forwarding mode is a local data termination mode indicating that the service data packet is only transmitted between a UE and the local service server, or the service data packet forwarding mode is a local data passing mode indicating that the service data packet being transmitted between the UE and a remote service server needs to be processed by the local service server; and s processing device 62 configured to process the service data packet in a processing scheme corresponding to the service data packet forwarding mode according to the service data packet forwarding mode corresponding to the local service server, and then transmit the service data packet.

In one embodiment, the determining device 61 is configured: upon reception of the service data packet transmitted by the local service server, to search the preset data forwarding information table for a service data packet forwarding mode corresponding to an IP address of the local service server according to the IP address of the local service server carried in the service data packet, and to determine the service data packet forwarding mode corresponding to the local service server.

In one embodiment, the processing device 62 is configured: when the service data packet forwarding mode corresponding to the local service server is the local data passing mode, and a destination IP address obtained from the service data packet is an IP address of the remote service server; to modify a format of the service data packet, to determine an uplink bearer for transmitting the modified service data packet to the remote service server, and to transmit the modified service data packet over the uplink bearer; or when the service data packet forwarding mode corresponding to the local service server is the local data passing mode, and a destination IP address obtained from the service data packet is an IP address of the UE, to determine a downlink bearer for transmitting the service data packet to the UE, and to transmit the service data packet over the downlink bearer.

In one embodiment, the processing device 62 configured to modify the format of the service data packet, to determine the uplink bearer for transmitting the modified service data packet to the remote service server, and to transmit the modified service data packet over the uplink bearer is configured: to obtain the IP address of the UE from a payload of the service data packet transmitted by the local service server according to a prescribed format, and then remove the IP address of the UE, and to compose a new service data packet; and to obtain an IP address of the local service server and information about an Access Point Name (APN) corresponding to an IP address of the remote service server according to the preset data forwarding information table, to determine the uplink bearer, corresponding to the UE, under the APN, and to transmit the new service data packet to a System Architecture Evolved Gateway (SAE-GW) over the uplink bearer, so that the SAE-GW transmits the new service data packet to the remote service server.

In one embodiment, the processing device 62 configured to determine the downlink bearer for transmitting the service data packet to the UE, and to transmit the service data packet over the downlink bearer is configured: to search a pre-stored corresponding relationship table between the IP address of the UE and the bearer for bearer information corresponding to the UE according to the IP address of the UE obtained from the service data packet; and to determine the downlink bearer for transmitting the service data packet to the UE according to the bearer information, and to transmit the service data packet to an c-NB over the downlink bearer, so that the e-NB transmits the service data packet to the UE.

In one embodiment, the processing device 62 is further configured: when the service data packet forwarding mode is the local data termination mode, to determine that the service data packet needs to be transmitted to the UE; and to obtain an IP address of the UE from the service data packet, to determine a downlink bearer for transmitting the service data packet to the UE, according to the IP address of the UE, and to transmit the service data packet to an e-NB over the downlink bearer, so that the e-NB transmits the service data packet to the UE.

In one embodiment, the determining device is further configured, upon reception of a service data packet forwarded by a System Architecture Evolved Gateway (SAE-GW), to obtain a destination IP address from the service data packet, and to determine a network entity corresponding to the destination IP address.

The processing device 62 is further configured: when the determining device 61 receives the service data packet forwarded by the SAE-GW, and determines that the network entity corresponding to the destination IP address in the service data packet is the local service server, to transmit the service data packet received by the determining device to the local service server; or when the determining device 61 receives the service data packet forwarded by the SAE-GW, and determines that the network entity corresponding to the destination IP address in the service data packet is the UE, to determine a downlink carrier for transmitting the service data packet to the UE, according to an IP address of the UE, and to transmit the service data packet received by the determining device to an e-NB over the downlink bearer, so that the e-NB transmits the service data packet to the UE.

Figure 7:
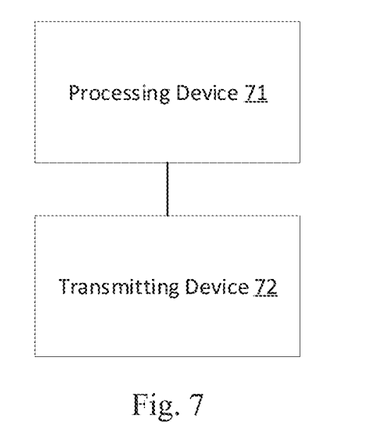
FIG. 7 is a schematic structural diagram of another apparatus for transmitting data according to an embodiment of the invention.

Referring to FIG. 7, an apparatus for transmitting service data at the local service server side according to an embodiment of the invention includes: a processing device 71 configured, when a service data packet needs to be transmitted to a remote service server, to carry an IP address of the apparatus as a source IP address, and an IP address of the remote service server as a destination IP address in the service data packet, to add an IP address of a UE to a payload of the service data packet according to a prescribed format, and to compose a new service data packet; and a transmitting device 72 configured to transmit the new service data packet to a MEC server, so that the MEC server determines a service data packet forwarding anode corresponding to the apparatus according to the IP address of the apparatus, and processes the service data packet in a processing scheme corresponding to the service data packet forwarding mode according to the service data packet forwarding mode corresponding to the apparatus, and then transmits the service data packet.

In one embodiment, the processing device 71 is further configured: t receive a service data packet, transmitted by the remote service server, forwarded by the MEC server, to process the received service data packet, and then generate a service data packet to be transmitted, to carry the IP address of the apparatus as a source IP address, and the IP address of the UE as a destination IP address in the generated service data packet.

The transmitting device 72 is further configured to transmit the generated service data packet carrying the IP address of the apparatus, and the IP address of the UE to the MEC server, so that the MEC server transmits the received service data packet to the UE.

A system for transmitting data according to an embodiment of the invention includes the apparatus above for transmitting data at the MEC server side, and the apparatus above for transmitting data at the local service server.

In the embodiments of the invention, the respective functional devices can be embodied as physical devices, e.g., a hardware processor, etc. with functions of transmitting, processing, etc.

The embodiments of the invention can be embodied as a method, a system or a computer program product. Therefore the invention can be embodied in the form of an all-hardware embodiment, an all-software embodiment or an embodiment of software and hardware in combination. Furthermore the invention can be embodied in the form of a computer program product embodied in one or more computer useable storage mediums (including but not limited to a disk memory, a CD-ROM, an optical memory, etc.) in which computer useable program codes are contained.

The invention has been described in a flow chart and/or a block diagram of the method, the device (system) and the computer program product according to the embodiments of the invention. It shall be appreciated that respective flows and/or blocks in the flow chart and/or the block diagram and combinations of the flows and/or the blocks in the flow chart and/or the block diagram can be embodied in computer program instructions. These computer program instructions can be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions can also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions can also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

The invention claimed is:

1. A method for transmitting data, the method comprising:
   determining, by a Mobile Edge Computing, MEC, server, a service data packet forwarding mode corresponding to a local service server according to a preset data forwarding information table upon reception of a service data packet transmitted by the local service server, wherein the service data packet forwarding mode is a local data termination mode indicating that the service data packet is only transmitted between a User Equipment, UE, and the local service server, or the service data packet forwarding mode is a local data passing mode indicating that the service data packet being transmitted between the UE and a remote service server needs to be processed by the local service server; and
   processing, by the MEC server, the service data packet in a processing scheme corresponding to the service data packet forwarding mode according to the service data packet forwarding mode corresponding to the local service server, and then transmitting, by the MEC server, the service data packet;
   wherein said processing, by the MEC server, the service data packet in the processing scheme corresponding to the service data packet forwarding mode according to the service data packet forwarding mode corresponding to the local service server, and then transmitting, by the MEC server, the service data packet, comprises:
      when the service data packet forwarding mode corresponding to the local service server is the local data passing mode, and a destination IP address obtained by the MEC server from the service data packet is an IP address of the remote service server, modifying, by the MEC server, a format of the service data packet, determining, by the MEC server, an uplink bearer for transmitting the modified service data packet to the remote service server, and transmitting, by the MEC server, the modified service data packet over the uplink bearer;
      or
      when the service data packet forwarding mode corresponding to the local service server is the local data passing mode, and a destination IP address obtained by the MEC server from the service data packet is an IP address of the UE, determining, by the MEC server, a downlink bearer for transmitting the service data packet to the UE, and transmitting, by the MEC server, the service data packet over the downlink bearer.

2. The method according to claim 1, wherein determining, by the MEC server, the service data packet forwarding mode corresponding to the local service server according to the preset data forwarding information table upon reception of the service data packet transmitted by the local service server comprises:
   searching, by the MEC server, upon reception of the service data packet transmitted by the local service server, the preset data forwarding information table for a service data packet forwarding mode corresponding to an IP address of the local service server according to the IP address of the local service server carried in the service data packet, and determining, by the MEC server, the service data packet forwarding mode corresponding to the local service server.

3. The method according to claim 1, wherein when the service data packet forwarding mode corresponding to the local service server is the local data passing mode, and the destination IP address obtained by the MEC server from the service data packet is the IP address of the remote service server, modifying, by the MEC server, the format of the service data packet, determining, by the MEC server, the uplink bearer for transmitting the modified service data packet to the remote service server, and transmitting, by the MEC server, the modified service data packet over the uplink bearer comprises:
   obtaining, by the MEC server, the IP address of the UE from a payload of the service data packet transmitted by the local service server according to a prescribed format, and then removing the IP address of the UE, and composing a new service data packet; and
   obtaining, by the MEC server, an IP address of the local service server and information about an Access Point Name, APN, corresponding to an IP address of the remote service server according to the preset data forwarding information table, determining, by the MEC server, the uplink bearer, corresponding to the UE, under the APN, and transmitting, by the MEC server, the new service data packet to a System Architecture Evolved Gateway, SAE-GW, over the uplink bearer, wherein the SAE-GW transmits the new service data packet to the remote service server.

4. The method according to claim 1, wherein when the service data packet forwarding mode corresponding to the local service server is the local data passing mode, and the destination IP address obtained by the MEC server from the service data packet is the IP address of the UE, determining, by the MEC server, the downlink bearer for transmitting the service data packet to the UE, and transmitting, by the MEC server, the service data packet over the downlink bearer comprises:
   searching, by the MEC server, a pre-stored corresponding relationship table between the IP address of the UE and a bearer for bearer information corresponding to the UE according to the IP address of the UE obtained from the service data packet; and determining, by the MEC server, the downlink bearer for transmitting the service data packet to the UE according to the bearer information, and transmitting, by the MEC server, the service data packet to an e-NB over the downlink bearer, wherein the e-NB transmits the service data packet to the UE.

5. The method according to claim 1, wherein processing, by the MEC server, the service data packet in the processing scheme corresponding to the service data packet forwarding mode according to the service data packet forwarding mode corresponding to the local service server, and then transmitting, by the MEC server, the service data packet, comprises:

when the service data packet forwarding mode corresponding to the local service server is the local data termination mode, determining, by the MEC server, that the service data packet needs to be transmitted to the UE; and obtaining, by the MEC server, an IP address of the UE from the service data packet, determining, a downlink bearer for transmitting the service data packet to the UE, according to the IP address of the UE, and transmitting the service data packet to an e-NB over the downlink bearer, wherein the e-NB transmits the service data packet to the UE.

6. The method according to claim 1, wherein the method further comprises:

obtaining, by the MEC server, upon reception of a service data packet forwarded by a System Architecture Evolved Gateway, SAE-GW, a destination IP address from the service data packet; and upon determining that the destination IP address is an IP address of the local service server, transmitting, by the MEC server, the received service data packet to the local service server; or upon determining that the destination IP address is an IP address of the UE, determining, by the MEC server, a downlink carrier for transmitting the service data packet to the UE, according to an IP address of the UE, and transmitting, by the MEC server, the received service data packet to an e-NB over the downlink bearer, wherein the e-NB transmits the service data packet to the UE.

7. A method for transmitting data, the method comprising:

carrying, by a local service server, an IP address of the local service server as a source IP address, and an IP address of a remote service server as a destination IP address in the service data packet when the local service server needs to transmit a service data packet to the remote service server, adding, by the local service server, an IP address of a User Equipment, UE, to a payload of the service data packet according to a prescribed format, and composing, by the local service server, a new service data packet; and transmitting, by the local service server, the new service data packet to a Mobile Edge Computing, MEC, server, wherein the MEC server determines a service data packet forwarding mode corresponding to the local service server according to the IP address of the local service server, processes the service data packet in a processing scheme corresponding to the service data packet forwarding mode according to the service data packet forwarding mode corresponding to the local service server, and then transmits the service data packet.

8. The method according to claim 7, wherein the method further comprises:

receiving, by the local service server, a service data packet, transmitted by the remote service server, forwarded by the MEC server; and processing, by the local service server, the received service data packet, and then generating, by the local service server, a service data packet to be transmitted, carrying, by the local service server, the IP address of the local service server as a source IP address, and the IP address of the UE as a destination IP address in the generated service data packet, and then transmitting, by the local service server, the service data packet to the MEC server, wherein the MEC server transmits the received service data packet to the UE.

9. An apparatus for transmitting data, the apparatus comprising: a memory storing preset program codes, and at least one processor; wherein the at least one processor is configured to execute the preset program codes to:

determine a service data packet forwarding mode corresponding to a local service server according to a preset data forwarding information table upon reception of a service data packet transmitted by the local service server, wherein the service data packet forwarding mode is a local data termination mode indicating that the service data packet is only transmitted between a User Equipment, UE, and the local service server, or the service data packet forwarding mode is a local data passing mode indicating that the service data packet being transmitted between the UE and a remote service server needs to be processed by the local service server; and process the service data packet in a processing scheme corresponding to the service data packet forwarding mode according to the service data packet forwarding mode corresponding to the local service server, and then transmit the service data packet;

wherein the at least one processor is further configured to execute the preset program codes to:

when the service data packet forwarding mode corresponding to the local service server is the local data passing mode, and a destination IP address obtained from the service data packet is an IP address of the remote service server, modify a format of the service data packet, determine an uplink bearer for transmitting the modified service data packet to the remote service server, and transmit the modified service data packet over the uplink bearer;

or when the service data packet forwarding mode corresponding to the local service server is the local data passing mode, and a destination IP address obtained from the service data packet is an IP address of the UE, determine a downlink bearer for transmitting the service data packet to the UE, and transmit the service data packet over the downlink bearer.

10. The apparatus according to claim 9, wherein the at least one processor is further configured to execute the preset program codes to:

upon reception of the service data packet transmitted by the local service server, search the preset data forwarding information table for a service data packet forwarding mode corresponding to an IP address of the local service server according to the IP address of the local service server carried in the service data packet, and determine the service data packet forwarding mode corresponding to the local service server.

11. The apparatus according to claim 9, wherein the at least one processor is further configured to execute the preset program codes to:
  obtain the IP address of the UE from a payload of the service data packet transmitted by the local service server according to a prescribed format, and then remove the IP address of the UE, and compose a new service data packet; and
  obtain an IP address of the local service server and information about an Access Point Name, APN, corresponding to an IP address of the remote service server according to the preset data forwarding information table, to determine the uplink bearer, corresponding to the UE, under the APN, and transmit the new service data packet to a System Architecture Evolved Gateway, SAE-GW, over the uplink bearer, wherein the SAE-GW transmits the new service data packet to the remote service server.

12. The apparatus according to claim 9, wherein the at least one processor is further configured to execute the preset program codes to:
  search a pre-stored corresponding relationship table between the IP address of the UE and a bearer for bearer information corresponding to the UE according to the IP address of the UE obtained from the service data packet; and
  determine the downlink bearer for transmitting the service data packet to the UE according to the bearer information, and transmit the service data packet to an e-NB over the downlink bearer, wherein the e-NB transmits the service data packet to the UE.

13. The apparatus according to claim 9, wherein the at least one processor is further configured to execute the preset program codes to:
  when the service data packet forwarding mode is the local data termination mode, determine that the service data packet needs to be transmitted to the UE; and
  obtain an IP address of the UE from the service data packet, determine a downlink bearer for transmitting the service data packet to the UE, according to the IP address of the UE, and transmit the service data packet to an e-NB over the downlink bearer, wherein the e-NB transmits the service data packet to the UE.

14. The apparatus according to claim 9, wherein the at least one processor is further configured to execute the preset program codes to: upon reception of a service data packet forwarded by a System Architecture Evolved Gateway, SAE-GW, obtain a destination IP address from the service data packet, and determine a network entity corresponding to the destination IP address; and
  the at least one processor is further configured to execute the preset program codes to: when receiving the service data packet forwarded by the SAE-GW, and determining that the network entity corresponding to the destination IP address in the service data packet is the local service server, transmit the service data packet to the local service server; or when receiving the service data packet forwarded by the SAE-GW, and determining that the network entity corresponding to the destination IP address in the service data packet is the UE, determine a downlink carrier for transmitting the service data packet to the UE, according to an IP address of the UE, and transmit the service data packet to an e-NB over the downlink bearer, wherein the e-NB transmits the service data packet to the UE.

15. An apparatus for transmitting data, the apparatus comprising: a memory storing preset program codes, and at least one processor; wherein the at least one processor is configured to execute the preset program codes to:
  when a service data packet needs to be transmitted to a remote service server, carry an IP address of the apparatus as a source IP address, and an IP address of the remote service server as a destination IP address in the service data packet, add an IP address of a User Equipment, UE, to a payload of the service data packet according to a prescribed format, and to compose a new service data packet; and
  transmit the new service data packet to a Mobile Edge Computing, MEC, server, wherein the MEC server determines a service data packet forwarding mode corresponding to the apparatus according to the IP address of the apparatus, and processes the service data packet in a processing scheme corresponding to the service data packet forwarding mode according to the service data packet forwarding mode corresponding to the apparatus, and then transmits the service data packet.

16. The apparatus according to claim 15, wherein the at least one processor is further configured to execute the preset program codes to:
  receive a service data packet, transmitted by the remote service server, forwarded by the MEC server, process the received service data packet, and then generate a service data packet to be transmitted, carry the IP address of the apparatus as a source IP address, and the IP address of the UE as a destination IP address in the generated service data packet; and
  the at least one processor is further configured to execute the preset program codes to transmit the generated service data packet carrying the IP address of the apparatus, and the IP address of the UE to the MEC server, wherein the MEC server transmits the received service data packet to the UE.

* * * * *